US006819397B1

(12) United States Patent
Kuhara

(10) Patent No.: US 6,819,397 B1
(45) Date of Patent: Nov. 16, 2004

(54) REMOTE PHOTOGRAPHIC PROCESSING SYSTEM

(75) Inventor: Shuji Kuhara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/558,214

(22) Filed: Apr. 26, 2000

(30) Foreign Application Priority Data

Apr. 26, 1999 (JP) .......................................... 11-117822

(51) Int. Cl.[7] ........................ G03B 27/32; G03B 27/52; G03B 29/00; G06F 15/16

(52) U.S. Cl. ........................... 355/32; 355/40; 396/429; 707/10; 709/217

(58) Field of Search ................................ 396/311, 319, 396/429, 564; 355/18, 32, 40, 41; 358/1.15, 527, 1.18; 705/26, 27; 707/10, 102; 709/217

(56) References Cited

U.S. PATENT DOCUMENTS 5,477,353 A * 12/1995 Yamasaki ................... 358/487
5,666,215 A * 9/1997 Fredlund et al. ............ 358/487
5,760,916 A * 6/1998 Dellert et al. ............... 358/527
5,784,461 A * 7/1998 Shaffer et al. ................ 380/21
5,949,551 A * 9/1999 Miller et al. ................ 358/527
6,017,157 A * 1/2000 Garfinkle et al. ............. 355/40
6,085,195 A * 7/2000 Hoyt et al. .................... 707/10
6,147,744 A * 11/2000 Smart et al. ................... 355/40
6,154,295 A * 11/2000 Fredlund et al. ............ 358/487
6,157,435 A * 12/2000 Slater et al. ................... 355/40
6,185,371 B1 * 2/2001 Smart et al. ................ 396/311
6,201,931 B1 * 3/2001 Cipolla et al. .............. 396/311
6,219,129 B1 * 4/2001 Kinjo et al. .................. 355/40
6,324,521 B1 * 11/2001 Shiota et al. ................. 705/27
6,327,049 B1 * 12/2001 Ohtsuka .................... 358/1.18
6,578,072 B2 * 6/2003 Watanabe et al. ........... 709/217
2002/0067500 A1 * 6/2002 Yokomizo et al. ......... 358/1.15

FOREIGN PATENT DOCUMENTS

EP 856 972 A2 * 8/1998
EP 878 956 A1 * 11/1998
GB 2 286 944 A * 8/1995
JP 3-241349 10/1991
JP 3-241350 10/1991

* cited by examiner

*Primary Examiner*—Alan Mathews
(74) *Attorney, Agent, or Firm*—Morgan, Lewis & Bockius LLP

(57) ABSTRACT

The remote photographic processing system connects one or more photographic processing sites to a center having a database which stores a photographic printing condition at the photographic processing apparatus installed in each of the photographic processing sites via a communication line. The system then stores the photographic printing condition of previous printing such as simultaneous printing at each of the photographic processing sites. When each of the photographic processing sites which has received a request for later printing such as reprinting inquires the database in the center as to whether the photographic printing condition at the time of the previous printing corresponding to the request for the later printing is stored therein or not and catches that the photographic printing condition is stored, the request for the later printing is processed using the thus stored photographic printing condition. By using the remote photographic processing system, a photographic print having good reproducibility can be provided to a customer.

11 Claims, 2 Drawing Sheets

REMOTE PHOTOGRAPHIC PROCESSING SYSTEM

BACKGROUND OF THE INVENTION

Figure 1:
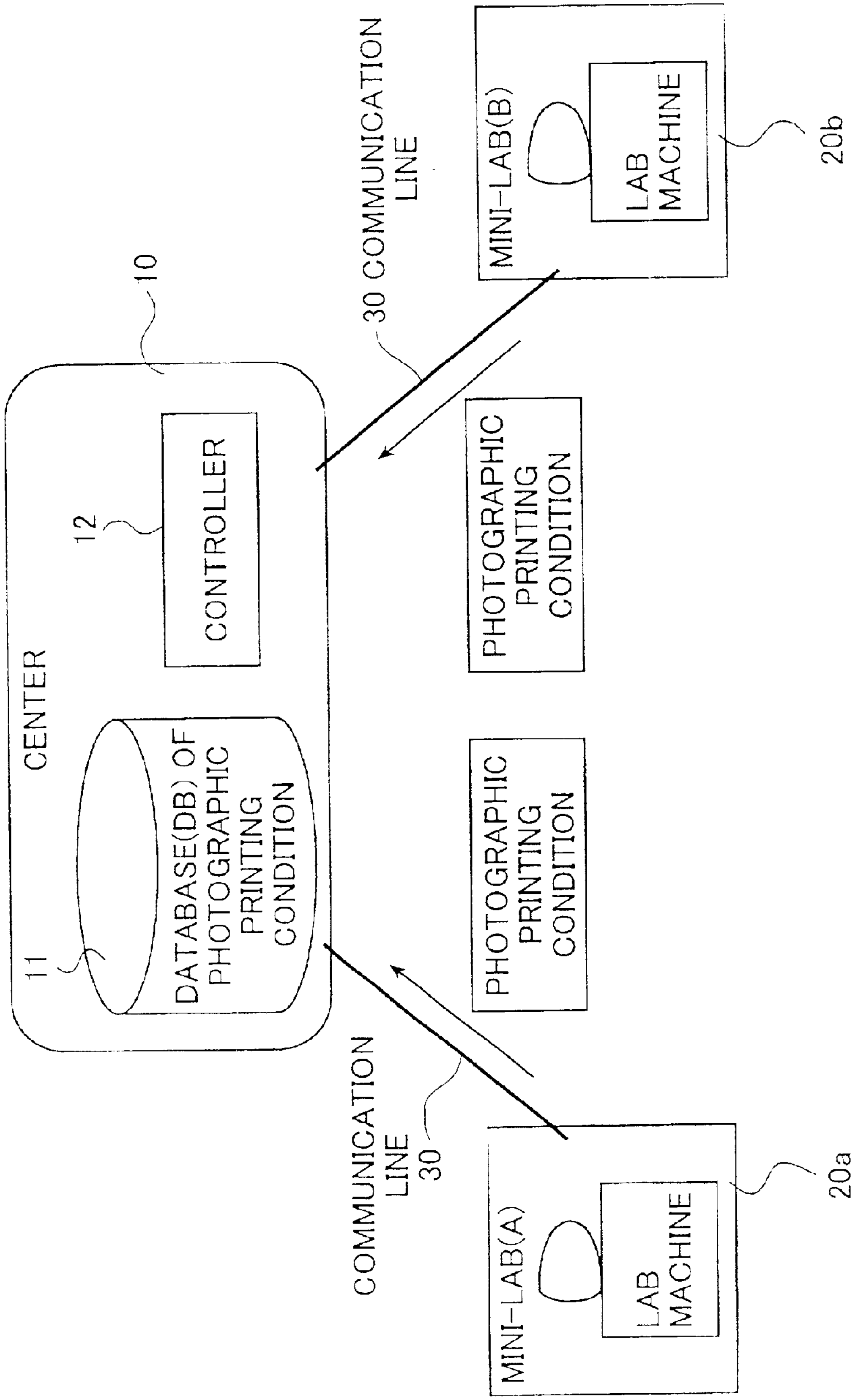

This invention relates to a remote photographic processing system and, more particularly, to a remote photographic processing system which allows photographic processing apparatus installed in plurality of places to provide a customer with photographic prints having good reproducibility by utilizing respective exposing conditions stored in a database (DB) established in a center.

In recent years, a photographic processing apparatus miniaturized for the purpose of promptly processing small quantities, so-called mini-lab system (small-scale photographic processing facility), has been gaining popularity. By enabling each section of such mini-lab system to be automatically operated, even an operator who does not have sufficient knowledge of photographic processing can produce a favorably finished photographic print.

As described above, the mini-lab system (miniature laboratory system) presupposes that the operator who does not have sufficient knowledge of photographic processing performs an operation; therefore, a plurality of mini-lab shops are connected via communication lines to the center in which an expert (namely, a person who has a high degree of knowledge and skill in various fields) is stationed so that such expert technician can communicate with each mini-lab shop to deal with various troubles which may arise at such mini-lab shop.

In this respect, for example, techniques disclosed in Unexamined Published Japanese Patent Application (kokai) Nos. 3-241349, 3-241350 and the like are available for reference. In these techniques, a state of photographic processing is sent from each mini-lab shop to the center as processing data of a reference sample and the thus sent data is analyzed in the center to be judged as to whether the state of photographic processing at each mini-lab shop is good or not.

In these techniques, however, as a substantial problem at the photographic processing facilities including the mini-lab shops, there is a case that finished states of photographic prints produced in two occasions, one being when a request for photographic processing on a photographic film (hereinafter referred to simply as "film") that a customer photographed (so-called request for simultaneous printing) is made and the other being when a request for follow-up printing from the same film (so-called "extra printing", hereinafter referred to simply as "reprinting") is made later, do not coincide with each other.

To cope with the above problem, it is well known that various countermeasures such as a method which records a printing condition on the back of the photographic print (so-called "simultaneous print") when the simultaneous printing is performed and produces a next print (extra print or reprint) based on the thus recorded printing condition at the time of next printing (namely, extra printing or reprinting) have been proposed and have achieved substantial effects. However, the above-mentioned method is only permissible when performances of the photographic processing facilities including the mini-labs are extremely high and maintained under a given condition.

In some cases, the customer requests the reprinting to a different mini-lab shop from the one to which the customer requested simultaneous printing. In this case, if the customer carries only his film for the request of reprinting, data at the time of the simultaneous printing is not available; hence the data can not be utilized as reference.

In consequence, the photographic print reprinted by the different mini-lab shop sometimes has a substantially different tone or the like from that of the simultaneous print. When the customer remembered a finished state of the simultaneous print, there were many cases in which the photographic print satisfactory to the customer could not be obtained.

SUMMARY OF THE INVENTION

The present invention has been accomplished under these circumstances and has as an object to solve the above problems inherent in the prior arts and provide a remote photographic processing system that is capable of providing a customer with a photographic print having good reproducibility.

In order to achieve the above object, the remote photographic processing system comprises one or more photographic processing sites, each having a photographic processing apparatus; and a center having a database which stores a photographic printing condition of each photographic processing apparatus installed in each of the photographic processing sites that is connected to the center via a communication line; wherein the photographic printing condition which is obtained when previous printing has been performed at each of the photographic processing sites and then sent to the database therefrom is stored in the database.

It is preferred that the previous printing is simultaneous printing.

In the system according to the present invention, when each of the photographic processing sites which has received a request for later printing inquires the database in the center as to whether the photographic printing condition at the previous printing corresponding to the request for the later printing is stored therein or not and catches that the photographic printing condition is stored, the request for the later printing is processed preferably using the photographic printing condition.

It is also preferred that the later printing is reprint.

Moreover, in the system according to the present invention, the photographic printing condition stored in the database in the center is erased preferably after a predetermined period of time has passed.

BRIEF DESSCRIPTION OF THE DRAWINGS

Figure 2:
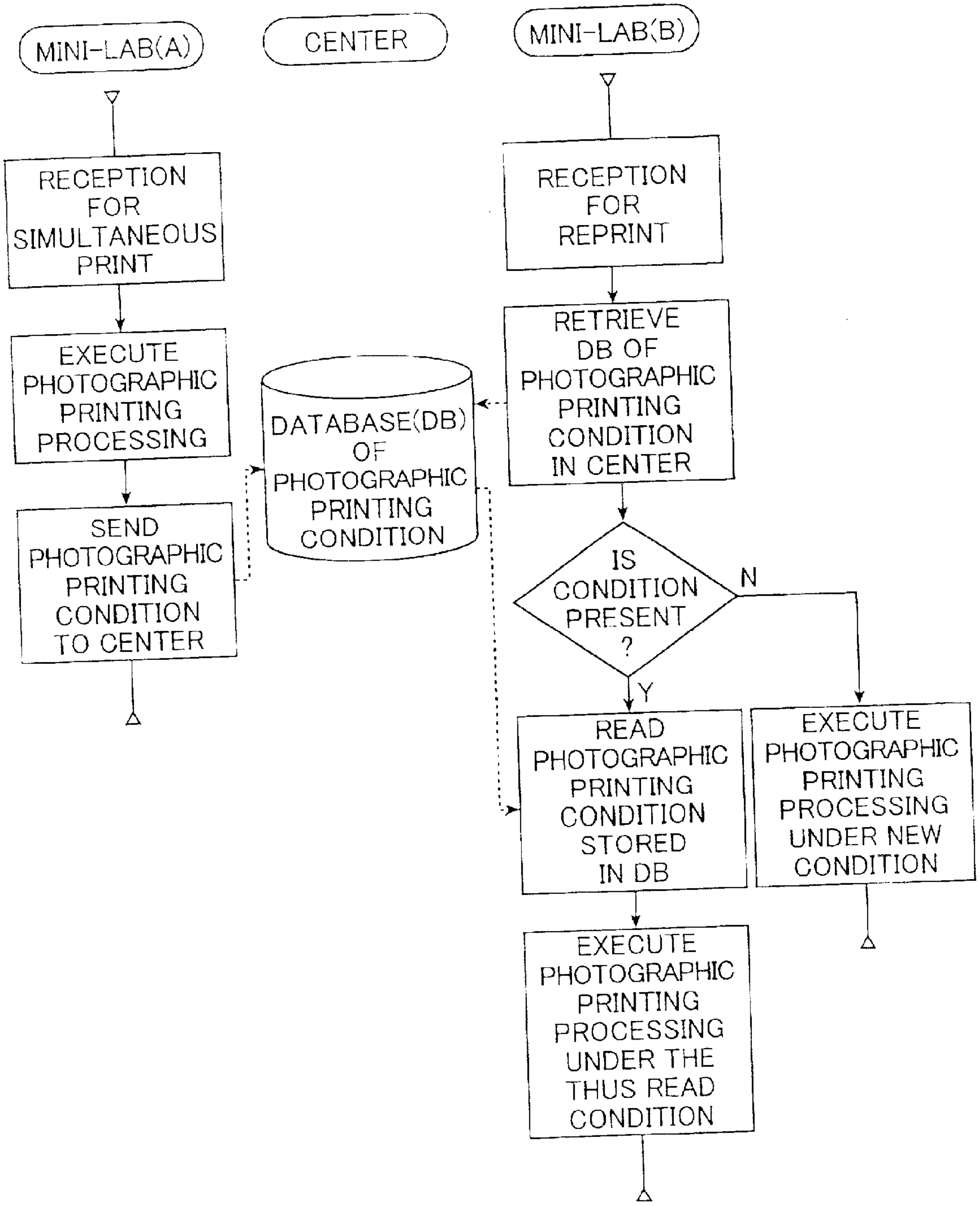

FIG. 1 is a block diagram showing a schematic construction of a remote photographic processing system according to an embodiment of the present invention; and FIG. 2 is a flowchart schematically illustrating operations of the remote photographic processing system according to the embodiment under consideration.

DETAILED DESCRIPTION OF THE INVENTION

The remote photographic processing system of the present invention is now described in detail below with reference to the preferred embodiments shown in the accompanying drawings.

FIG. 1 is a block diagram showing a schematic construction of a remote photographic processing system according to an embodiment of the present invention. In FIG. 1, a reference numeral 10 represents a center having a database 11 which stores a photographic printing condition in a photographic processing apparatus (comprising a photographic printer and a processor and hereinafter referred to simply as "lab machine") installed in each of photographic processing sites (hereinafter referred to simply as "mini-lab") (A) 20*a* and (B) 20*b*. The center 10 further has a controller 12 that controls the database 11.

In the embodiment shown in FIG. 1, only two mini-labs (A) 20*a* and (B) 20*b* are connected to the center 10 for the sake of simplification, but the number of the mini-labs to be connected to the center 10 is not limited to two and any number is permissible. However, since a request for next printing or later printing such as reprinting is issued from within a regionally-limited area in many cases, it is necessary to take this point into consideration when mini-labs to be connected to the center 10 are selected on a center basis.

Also, in the embodiment shown in FIG. 1, each of mini-labs (A) 20*a* and (B) 20*b* is shown to have one lab machine; however, it should be noted that each mini-lab may have a plurality of lab machine.

Moreover, the center 10 is not limited to any location as long as it is connected to mini-labs (A) 20*a* and (B) 20*b* via communication lines 30.

The database 11 established in the center 10 is constituted of a storing device having a capacity, at least, enough to meet information quantity corresponding to that of image frames of films to be processed for several weeks at each of mini-labs (A) 20*a* and (B) 20*b* when the simultaneous printing is performed. The device is not limited to any specific type, but faster access time is more preferred.

As a matter of course, the database 11 is constituted in such a manner that it can appropriately be accessed by each of mini-labs (A) 20*a* and (B) 20*b* so that any mini-lab can utilize information sent from the other mini-lab as a reference.

The communication lines 30 are not limited to any specific type, but ISDN (Integrated Services Digital Network) provided by NTT (Nippon Telegraph and Telephone Corporation) can preferably be used in Japan.

Operations of the remote photographic processing system according to the present embodiment constructed as described above will now be described in detail with reference to FIG. 2.

Given, for example, that a customer brings film to the mini-lab (A) 20*a* asking for the previous printing such as simultaneous printing, the mini-lab (A) 20*a* performs development processing of the film photographed by the customer, printing onto paper and development processing of the paper by ordinary processing steps to produce a photographic print. During these steps, if needed, printing may be performed by changing the printing condition (namely, remake printing).

A finished photographic print is delivered to the customer who made the request in exchange for a specified amount of money.

In some cases, the customer may place an order for an extra print (reprint) at this point of time. In this case, as described above, the mini-lab (A) 20*a* can of course easily produce the photographic print which is almost the same as that produced by the initial printing, namely, the simultaneous printing that is performed at the same time of processing (developing) the film photographed by the customer by using a photographic printing condition (hereinafter referred to simply as "printing condition") of each image frame stored in the mini-lab (A) 20*a* itself.

Before or after the time of delivery of the above-described photographic print, the mini-lab (A) 20*a* transmits at least an ID number specifying the film and the printing condition for each image frame on the film according to this photographic print via the above-described communication line 30 to the database 11 controlled by the controller 12 in the center 10, where they are stored. Transmission of such data may be executed at any timing arbitrarily set such as at predetermined time intervals, or after the end of the day's work or the like. Moreover, the thus set timing itself may appropriately be changed.

In the database 11 of the center 10, under control of the controller 12, data including the printing condition transmitted from each mini-lab are assorted into a form which can easily be retrieved on a mini-lab basis or the like and are efficiently stored.

Preferably, the storing capacity of the database 11 can be utilized effectively by erasing the thus received data automatically at the point of time when a predetermined time has passed.

Take, as another example, a case where the customer who received the simultaneous (photographic) print from the mini-lab (A) 20*a* requests the reprinting to another mini-lab (B) 20*b* several days later. As described above, the mini-lab (B) 20*b* is connected to the same center 10 which the mini-lab (A) 20*a* is connected to. Therefore, the mini-lab (B) 20*b* can gain access to the database 11 in the center 10 to obtain the printing condition which the database 11 stores for the photographic print produced at the mini-lab (A) 20*a*.

If only a few days have passed since the processing (simultaneous printing) was performed at the mini-lab (A) 20*a*, the printing condition (namely, that at the time of simultaneous printing) at the mini-lab (A) 20*a* is obtainable. Then, if the reprinting is performed at the mini-lab (B) 20*b* utilizing such printing condition, the photographic print having almost the same finishing as that obtained by processing (simultaneous printing) at the mini-lab (A) 20*a* can be produced.

The printing condition at the time of the simultaneous printing as used herein represents a digital-type image processing condition, specifically, which image processing has been performed and, in this case, which LUT (look-up table) has been employed or the like. This corresponds to setting of a filter or timer in a case of analog-type printing.

When the reprint is produced at the same mini-lab, the mini-lab may use information stored in the database 11 in the above-described center 10 so that there is no need to store the processing condition (printing condition) of each individual mini-lab on a mini-lab basis.

When the reprinting is performed by changing the printing condition at the time of simultaneous printing, the thus changed condition may be sent to the center 10 as a new condition to be stored in the database 11 therein.

In a preferred embodiment, if the print condition at the time of the simultaneous printing or previous printing is not stored to the database 11 when the mini-lab (A) 20*a* or (3) 20*b* having received a request for reprinting frame images of a film gains access to the center 10, the mini-lab (A) 20*a* or (B) 20*b* determines a print condition based on the frame images of the film to be reprinted and at the same time, gains access to the center 10 to store the thus determined print condition to the database 11.

A period between the above-described simultaneous printing or the previous printing and the reprinting or the later printing changes depending on seasons, locations or the like, but is approximately one to two weeks. Therefore, a storage time of the photographic printing condition in the database 11 of the center 10 should be or may be decided in accordance with an actual case under the above-described period.

It should be noted that the above-described embodiment illustrates an example of the present invention and that the present invention is by no means limited to the above embodiment.

As described in detail above, according to the present invention, the remote photographic processing system capable of providing the customer with the photographic print having good reproducibility can be realized.

In other words, according to the photographic processing system according to the present invention, the reprint having finish which is by no means inferior to that of the simultaneous print can be produced by a simple operation in a comparatively easy manner so that not only the customer is satisfied therewith but also a great influence is exerted on the efficiency of management/operation of a mini-lab chain.

What is claimed is:

1. A remote photographic processing system, comprising:

a plurality of different photographic processing sites, each having a photographic processing apparatus; and a center having a database which stores a photographic printing condition used for producing a photographic print at each photographic processing apparatus installed in each of said photographic processing sites that are connected to said center via a communication line, wherein said photographic printing condition used for producing said photographic print at a previous printing at each of said photographic processing sites is sent to the database therefrom and then stored in the database, and said photographic printing condition is determined for each original image and set for one original image to achieve coincidence in color or density finishing of photographic prints reproduced from said one original image at the time of a later printing and said previous printing, wherein when one photographic processing site among a plurality of said photographic processing sites has received a request for said later printing of said one original image, said one photographic processing site inquires said database in said center as to whether said photographic printing condition of said one original image at said previous printing corresponding to said request for said later printing is stored therein or not; and obtains said photographic printing condition of said one original image from said database at said one photographic processing site, if said photographic printing condition of said one original image is stored, and wherein said one photographic processing site processes said request for said later printing of said one original image using said obtained photographic printing condition of said one original image to produce a later photographic print reproduced from said one original image, which achieves coincidence in color or density finishing of said previous photographic print reproduced from said one original image receiving said request for said later printing.

2. The system according to claim 1, wherein said previous printing is an initial printing.

3. The system according to claim 1, wherein, when each of said photographic processing sites which has received a request for later printing inquires the database in said center as to whether said photographic printing condition at said previous printing corresponding to the request for the later printing is stored therein or not and obtains said photographic printing condition if stored, the request for the later printing is processed using said photographic printing condition.

4. The system according to claim 1, wherein said later printing is a reprint.

5. The system according to claim 1, wherein said photographic printing condition stored in the database in said center is erased after a predetermined period of time has passed.

6. A remote photographic processing system, comprising:

a plurality of different photographic processing sites, each having a photographic processing apparatus; and a center having a database which stores a photographic printing condition of each photographic processing apparatus installed in each of said photographic processing sites that is connected to said center via a communication line, wherein said photographic printing condition which is obtained when a previous printing has been performed at each of said photographic processing sites and then sent to the database therefrom is stored in the database, a print with said photographic printing condition can be obtained by access to said center from any of said photographic processing sites connected to said center via the communication line, and said photographic printing condition is determined for each original image and set for one original image to achieve coincidence in color or density finishing of photographic prints reproduced from said one original image at the time of a later printing and said previous printing, wherein when one photographic processing site among a plurality of said photographic processing sites has received a request for said later printing of said one original image, said one photographic processing site inquires said database in said center as to whether said photographic printing condition of said one original image at said previous printing corresponding to said request for said later printing is stored therein or not; and obtains said photographic printing condition of said one original image from said database at said one photographic processing site, if said photographic printing condition of said one original image is stored, and wherein said one photographic processing site processes said request for said later printing of said one original image using said obtained photographic printing condition of said one original image to produce a later photographic print reproduced from said one original image, which achieves coincidence in color or density finishing of said previous photographic print reproduced from said one original image receiving said request for said later printing.

7. The system according to claim 6, wherein said previous printing is an initial printing.

8. The system according to claim 6, wherein, when each of said photographic processing sites receives a request for later printing, and then queries the database in said center as to whether said photographic printing condition at said previous printing corresponding to the request for the later printing is stored therein and obtains said photographic printing condition if stored, the request for the later printing is processed using said photographic printing condition.

9. The system according to claim 6, wherein said later printing is a reprint.

10. The system according to claim 6, wherein said photographic printing condition stored in the database in said center is erased after a predetermined period of time has passed.

11. A remote photographic processing method, comprising the steps of:

obtaining a photographic printing condition set for one original image used for producing a previous photographic print reproduced from said one original image at a photographic processing apparatus when previous printing has been performed at each of a plurality of different photographic processing sites each of which has said photographic processing apparatus;

sending to a center having a database said photographic printing condition obtained at the time of said previous printing in said photographic processing apparatus installed in each of said photographic processing sites that is connected to said center via a communication line;

storing in said database in said center said photographic printing condition of said one original image, obtained at the time of said previous printing and sent to said center;

accessing to said database in said center at the time of later printing from each of said photographic processing sites to obtain said photographic printing condition of said one original image obtained at the time of said previous printing and stored in said database;

performing said later printing using said photographic printing condition of said one original image obtained from said database in said photographic processing apparatus installed in each of said photographic processing sites to produce a later photographic print reproduced from said one original image, wherein said photographic printing condition is determined for each original image and set for said one original image to achieve coincidence in color or density finishing of said later and previous photographic prints reproduced from said one original image at the time of said later printing and said previous printing, wherein said accessing step includes:

when one photographic processing site among a plurality of said photographic processing sites has received a request for said later printing of said one original image, inquiring said database in said center from said one photographic processing site as to whether said photographic printing condition of said one original image at said previous printing corresponding to said request for said later printing is stored therein or not; and obtaining said photographic printing condition of said one original image from said database at said one photographic processing site, if said photographic printing condition of said one original image is stored, and wherein said performing step includes:

processing said request for said later printing of said one original image using said obtained photographic printing condition of said one original image at said one photographic processing site to produce said later photographic print reproduced from said one original image, which achieves coincidence in color or density finishing of said previous photographic print reproduced from said one original image receiving said request for said later printing.

* * * * *